(12) United States Patent
Betts et al.

(10) Patent No.: US 7,486,698 B2
(45) Date of Patent: Feb. 3, 2009

(54) MULTIPLEXING OF CONTROL AND DATA OVER AN HTTP CONNECTION

(75) Inventors: Craig Betts, Kanata (CA); David Pochopsky, Ottawa (CA); Martin Barnes, Kanata (CA); Greg Bertin, Ottawa (CA); Peter Ashton, Nepean (CA); Wayne Burwell, Ottawa (CA)

(73) Assignee: Solace Systems, Inc., Ottawa, Ontario (CA)

( * ) Notice: Subject to any disclaimer, the term of this patent is extended or adjusted under 35 U.S.C. 154(b) by 466 days.

(21) Appl. No.: 11/012,108

(22) Filed: Dec. 16, 2004

(65) Prior Publication Data

US 2005/0135418 A1 Jun. 23, 2005

Related U.S. Application Data

(60) Provisional application No. 60/530,678, filed on Dec. 19, 2003.

(51) Int. Cl.
*H04L 1/00* (2006.01)
(52) U.S. Cl. .................................. 370/469; 709/226
(58) Field of Classification Search ................ 370/469, 370/401; 709/230, 232, 229, 201, 203, 213, 709/202, 227, 238
See application file for complete search history.

(56) References Cited

U.S. PATENT DOCUMENTS

| | | | | |
|---|---|---|---|---|
| 5,999,979 A * | 12/1999 | Vellanki et al. | ............. | 709/232 |
| 6,021,443 A | 2/2000 | Bracho et al. | | |
| 6,091,724 A | 7/2000 | Chandra et al. | | |
| 6,501,956 B1 * | 12/2002 | Weeren et al. | ............. | 455/463 |
| 6,795,848 B1 * | 9/2004 | Border et al. | ............... | 709/213 |
| 6,862,624 B2 * | 3/2005 | Colby et al. | ................ | 709/226 |
| 6,920,502 B2 * | 7/2005 | Araujo et al. | ............... | 709/229 |
| 6,934,756 B2 * | 8/2005 | Maes | ......................... | 709/227 |
| 6,976,090 B2 * | 12/2005 | Ben-Shaul et al. | .......... | 709/246 |
| 6,990,513 B2 * | 1/2006 | Belfiore et al. | .............. | 709/203 |
| 7,065,706 B1 * | 6/2006 | Sankar | ....................... | 715/234 |
| 7,117,267 B2 * | 10/2006 | Bavadekar | ................... | 709/230 |
| 7,164,762 B2 * | 1/2007 | Hanson et al. | ......... | 379/212.01 |
| 7,222,152 B1 * | 5/2007 | Thompson et al. | .......... | 709/202 |
| 7,224,697 B2 * | 5/2007 | Banerjea et al. | ............ | 370/401 |
| 7,256,711 B2 * | 8/2007 | Sheha et al. | ............. | 340/995.1 |
| 7,257,634 B2 * | 8/2007 | Colby et al. | ................ | 709/226 |
| 2002/0042839 A1 * | 4/2002 | Peiffer et al. | ................ | 709/238 |
| 2003/0028650 A1 * | 2/2003 | Chen et al. | ................... | 709/229 |
| 2003/0033416 A1 * | 2/2003 | Schwartz | .................... | 709/230 |
| 2003/0099237 A1 | 5/2003 | Mitra et al. | | |
| 2004/0088346 A1 * | 5/2004 | Hassler et al. | .............. | 709/201 |
| 2004/0143665 A1 * | 7/2004 | Mace et al. | .................. | 709/227 |
| 2005/0060414 A1 * | 3/2005 | Phillips et al. | .............. | 709/227 |
| 2005/0266884 A1 * | 12/2005 | Marriott et al. | ............. | 455/558 |

(Continued)

OTHER PUBLICATIONS

Carzaniga, A. et al. "A Routing Schemem for Content-Based Networking"; Department of Computer Science Technical Report, University of Colorado; Jun. 2003; Boulder, Colorado, USA.

(Continued)

*Primary Examiner*—Thong H Vu
(74) *Attorney, Agent, or Firm*—Marks & Clerk; Richard J. Mitchell

(57) ABSTRACT

A method for exchanging control and customer data between network element in a communications network involves establishing a virtual connection between the routers, and exchanging the control and customer data over an http layer.

15 Claims, 2 Drawing Sheets

U.S. PATENT DOCUMENTS

2006/0031407 A1* 2/2006 Dispensa et al. ............ 709/219
2007/0008884 A1* 1/2007 Tang ......................... 370/230

OTHER PUBLICATIONS

Berners-Lee, T. et al. "Uniform Resource Identifiers (URI): Generic Syntax"; Aug. 1998; The Internet Society; USA.

Berners-Lee, T. et al "Hypertext Transfer Protocol—HTTP/1.0"; May 1996; The Internet Society; USA.

Fielding R. et al. "Hypertext Transfer Protocal—HTTP/1.1"; Jun. 1999; The Internet Society; USA.

\* cited by examiner

MULTIPLEXING OF CONTROL AND DATA OVER AN HTTP CONNECTION

CROSS REFERENCE TO RELATED APPLICATION

This application claims the benefit under 35 USC 119(e) or prior U.S. provisional application Ser. No. 60/530,678 filed Dec. 19, 2003, the contents of which are incorporated herein by reference.

FIELD OF THE INVENTION

This invention relates to the field of data communication networks, and in particular to a method of passing application protocol streams between any device in a data communications network, such as a content based network having XML routers.

BACKGROUND OF THE INVENTION

Content-based networks are described in A. Carzaniga, M. J. Rutherford, A. L. Wolf. A routing scheme for content-based networking. Department of Computer Science, University of Colorado, June 2003, the contents of which are herein incorporated by reference.

In content routed networks, one of the factors that determine network scalability is the limited number of TCP connections supported by each router. Between any two adjacent content routers, both control and customer data needs to be exchanged. Within the control data flows, two distinct protocols are defined; the XML Link State Protocol (XLSP) and XML Subscription Management Protocol (XSMP), both of which are components of the Implicit Routing Protocol (IRP). Refer to co-filed application Ser. No. 60/530,615, which is herein incorporated by reference. In this example, there are three application protocol streams being exchanged between each pair of content routers: an XSMP control stream, an XLSP control stream, and a data stream.

A traditional method for passing these three data flows between devices would be to establish separate TCP connections for each data flow. Multiplexing and de-multiplexing of the data at each end would be accomplished via distinct TCP port numbers. However, this technique has two significant drawbacks:

1. The number of TCP connections supported by any one networking device may be (relatively) small, and hence the wasteful usage of TCP connections would quickly limit the size and scalability of the network.
2. In a firewalled environment, the administrative overhead of configuring the firewalls to allow each type of connection significantly increases the administrative effort required to deploy the content routed network.

As an example, in FIG. 1, consider the relatively small network 1. Here, the topology includes seven content routers 2, interconnected with thirteen XML links 3. Using TCP multiplexing, a total of thirty nine connections would be required. Each XML link 2 between a pair of content routers requires three TCP connections under this scheme since one TCP connection is needed to exchange customer data, which in a content-routed network is the events or documents that are being routed, a second TCP connection is needed for the XLSP protocol, and a third TCP connection is needed for the XSMP protocol. It is apparent that TCP connections would quickly limit network scalability, as the number of routers increases into the hundreds and number of XML links increases into the thousands or tens of thousands. Moreover, as new inter-router protocols are developed to enable new services or capabilities within the content routed network 1, yet more TCP connections would be required between a pair of routers connected with an XML link, further compounding the problem.

SUMMARY OF THE INVENTION

The invention discloses a novel technique for multiplexing flows for customer data and one or more control protocols over a single HTTP/TCP connection, which allows the reduction by one half or more in the number of TCP connections required for a given network topology. The invention is applicable to any device where multiple protocols can share a single HTTP connection.

According to the present invention there is provided a method of passing application protocol streams between network elements in a data communications network, comprising establishing a virtual connection between said network elements, establishing an HTTP layer within said virtual connection; and multiplexing said application protocol streams over said HTTP layer.

The invention may be applied to XML routers in a content based network, although it is not limited to use with XML routers.

Embodiments of the invention can, for example, be used to identify control and data plane sub-systems within an XML router using HTTP Universal Resource Identifier (URI) arguments. HTTP and the HTTP URI is defined in RFC2616, "HyperText Transfer Protocol—HTTP/1.1", June 1999; RFC1945, "Hypertext Transfer Protocol—HTTP/1.0", May 1996, and also in RFC2396, "Uniform Resource Identifiers (URI): Generic Syntax.", August 1998, all from The Internet Society.

Control and data traffic can be multiplexed over a single TCP connection, in which case HTTP is used as the de-multiplexing mechanism.

The invention also provides a method for ensuring that when control and data plane traffic is multiplexed over a single TCP connection, the prioritization of control plane messages is achieved via queue servicing.

The invention still further provides a router for use in a data communications network, wherein said router is configured to establish a virtual connection with other routers in the network, establish an HTTP layer within said virtual connection; and multiplex application protocol streams over said HTTP layer.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
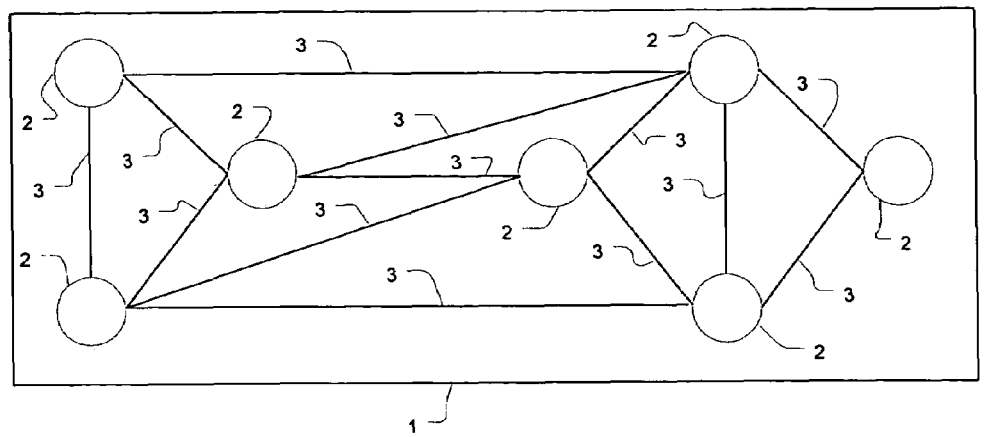
FIG. 1 shows a Content Routing Network.
Figure 2:
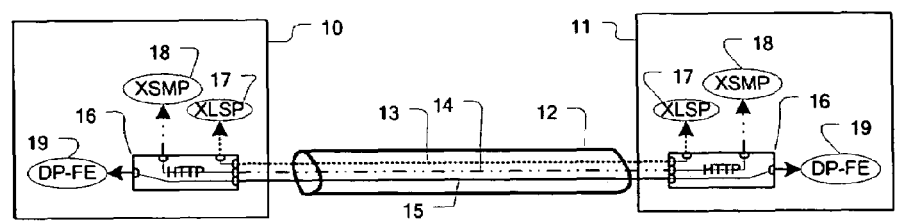
FIG. 2: shows Multiplexing over HTTP/TCP.

In accordance with the principles of the invention all data exchanged between adjacent routers in the content based network of FIG. 1 is carried via HTTP over TCP. A single TCP connection between routers can be achieved, if the HTTP layer is used to de-multiplex the control and data flows, as shown in FIG. 2. Two routers 10 and 11 are connected by an HTTP over TCP connection 12, which is terminated by the HTTP function 16 in each router. Within the single HTTP over TCP connection 12, there are three flows 13, 14 and 15. Flow 13 connects the XLSP protocol 17 in each router 10 and 11. Flow 14 connects the XSMP protocol 18 in each router 10 and 11. Flow 15 connects the Data Plane Forwarding Engine (DP-FE) 19 in each router 10 and 11.

HTTP identifies "paths" or locations for the exchanged data via field called the Uniform Resource Identifier (URI). The definition of the HTTP URI, specified in the reference above, allows the passing of arguments between the communicating devices. Arguments are identified by the leading character "?". The general form of the HTTP Universal Resource Locator (URL), which is a form of a Universal Resource Identifier (URI) is:

"http:" "//" host [":" port] [abs_path ["?" query]]

Within the "query" portion, the "?name" argument is used to identify and de-multiplex data flows to the appropriate sub-systems within the content router, for example, the three subsystems 17, 18 and 19 shown in FIG. 2. For example, http://<router_ip>/?name=<subsystem_name>

There are three currently recognized values for <subsystem_name>, which are identified in FIG. 2. As an example, when sending an XLSP message to the adjacent content router with IP address 192.168.10.1, the URI would be:

http://192.168.10.1/?name=XLSP

The default subsystem is the DP-FE, and if an HTTP message is received without the name=<subsystem_name> parameter specified, then the DP-FE subsystem 19 is selected by default.

Another method to use a single HTTP session to multiplex/demultiplex multiple protocol flows is to use the "absolute path" portion of the URI to specify the subsystem. For example:

http://192.168.10.1/<subsystem_name> where subsystem name is one of those specified in FIG. 2. For example, for the XLSP subsystem 17, the URI would be:

http://192.168.10.1/XLSP

Additionally, other HTTP header fields could be utilized instead of the HTTP URI in order to specify the subsystem name for the purposes of multiplexing/demultiplexing multiple protocol flows over a single HTTP connection. HTTP consists of numerous header fields to carry various control information, such as the HTTP content length. One of these existing fields could be used to define the subsystem, or a new header field could be defined. For example, the defined HTTP "pragma" general-header field could be used to specify the subsystem. For example, in order to specify the XLSP subsystem:

Pragma: XLSP

Alternatively, if a new field "subsystem" was defined and used as part of the HTTP header, the subsystem could be specified as:

subsystem=XLSP

The technique of multiplexing control and data flows over a single TCP connection presents a potential problem in the prioritization of control traffic over data traffic (or more generally higher priority application traffic over lower priority application traffic). In the presence of heavy volumes of customer dataplane traffic (handled by the DP-FE subsystem 19 of FIG. 2), links can become congested, which can lead to significant delays or lost messages. It is critical that the Implicit Routing Protocol (IRP) protocol messages are isolated from these effects, as they can lead to routing instabilities, routing cycles and lost subscriptions; all of which lead to a disruption in customer data. Note that the IRP function is composed of the XLSP subsystem and the XSMP subsystem. The IRP is described in co-filed application Ser. No. 60/530, 615.

Design techniques are applied to the outbound traffic direction to mitigate the effect of congestion on IRP protocol traffic.

Congestion on a TCP connection is reflected by a backup of outgoing messages ready to be sent on that connection. These messages are stored internally in the content router in a software queuing data structure (which can also be implemented as a hardware queue if the HTTP over TCP function is implemented using hardware acceleration). By separating the control and dataplane traffic into separate queues, and imposing a queue servicing and scheduling discipline across the queues, it is possible to minimize the delays experienced by the control traffic.

Figure 3:
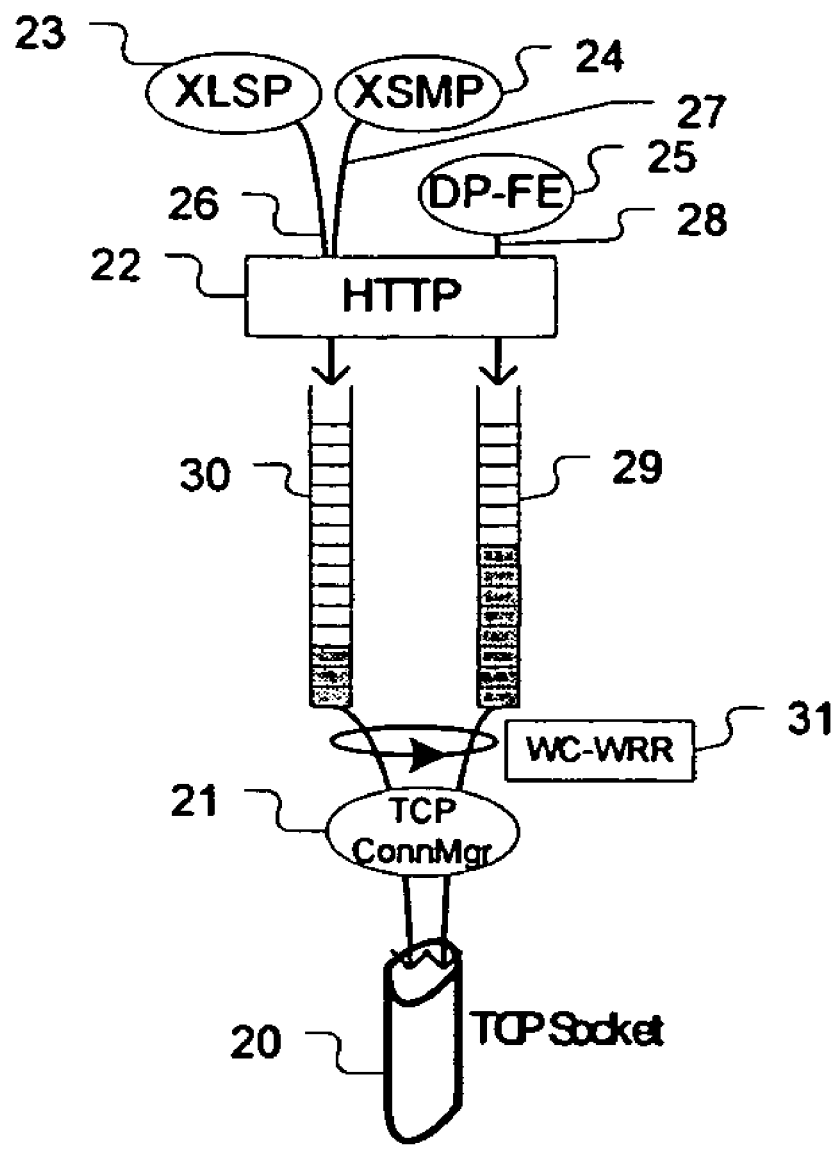
FIG. 3 shows Outbound Queue Scheduling.

The scheduling discipline chosen is a Work Conserving-Weighted Round Robin, as depicted in FIG. 3. Work conserving involves scheduling disciplines which always make use of available link bandwidth. Weighted Round Robin is a scheduling discipline which cycles through a set of queues, and grants access to the physical medium based on weights assigned to the queues. In this scheme, the two queues can be assigned weights M:N, such that under congestion scenarios, the bandwidth received by the control queue is M/(N+M) of the total available bandwidth. Typical values for M:N are 5:1.

Since the ratio of data plane traffic to control messaging is typically largely biased in favor of the data plane (i.e. in typical network operations there are many more data plane messages than control plane messages), it is rare that control messaging will ever consume the full bandwidth available to it. In these cases the work conserving aspect of the scheduler kicks in: if one of the queues has no data to send in its timeslot, the other queue is serviced.

The queuing is shown in FIG. 3. A single TCP socket (TCP connection) 20 carries the three application flows of XLSP 23, XSMP 24 and DP-FE 25 as described above, using HTTP 22. The XLSP subsystem 23 produces a message flow 26. The XSMP subsystem 24 produces a message flow 27. The DP-FE subsystem 25 produces a message flow 28. These messages are formatted as HTTP by the HTTP block 22. The XLSP 23 and XSMP 24 messages are placed into queue 30, and the DP-FE 25 messages are placed into queue 29. The Work Conserving-Weighted Round Robin (WC-WRR) block 31 is responsible for managing the removal of messages from queues 30 and 29 for sending to the TCP connection manager block 21, which manages the TCP connection 20. Queue 30 carries the control plane traffic, and queue 29 carries the dataplane traffic.

In FIG. 3, a single queue 30 is used for both XLSP 23 and XSMP 24, which together comprise the IRP. However, each of these two subsystems could be given their own queue if the traffic between XLSP and XSMP needed different priority treatment. In addition, additional subsystems could be added to the system in addition to the three shown, and this could result in the addition of additional queues, or the new subsystems could share existing queues 29 and 30.

It will be appreciated by persons skilled in the art that many variants of the invention are possible.

All references mentioned above are herein incorporated by reference.

We claim:

1. A method of operating a content-routed data communications network comprising a plurality of content routers, wherein control data flows constituting control plane traffic and customer data flows constituting dataplane traffic are exchanged between said content routers, said control data flows including application protocol messages forming part of a routing protocol, and wherein said routers comprise application subsystems associated with said respective control data and customer data flows, said method comprising:

establishing virtual connections between respective pairs of said routers;

establishing an HTTP layer within each said virtual connection between a pair of said routers;

assigning to each of said application subsystems within a said router an HTTP header field;

for each control data flow or customer data flow flowing between a pair of corresponding application subsystems in respective routers of a pair of routers interconnected by a said virtual connection, formatting said control data and customer data flows as HTTP control and data messages within said HTTP layer and associating with said control and data messages the HTTP header field of the corresponding application subsystem; and multiplexing said control data and customer data flows over said HTTP layers between said pairs of routers using said HTTP header fields to distinguish between said flows within each said virtual connection; and said method further comprising:

separating said formatted HTTP control and data messages into respective separate control data and customer data queues for transmission over said virtual connection;

monitoring said virtual connection for congestion; and assigning weights to said control data and customer data queues such that in the event of congestion on said virtual connection, said control queue is guaranteed a fraction of total available bandwidth determined by the weights assigned to said respective queues, and wherein said network elements are XML-based routers, and wherein said control data flows comprise a first data flow connecting an XML link state protocol in each XML router, and a second flow connecting an XML subscription management protocol in each router, and wherein said customer data flow connects a data plane forwarding engine in each router.

2. The method of claim 1, wherein application sub-systems are identified using HTTP URI arguments.

3. The method of claim 1, wherein said application sub-systems are identified using "absolute path" portions of HTTP URIs.

4. The method of claim 1, wherein said application sub-systems are identified using HTTP header fields other than a URI field.

5. The method of claim 1, wherein said virtual connection is a TCP connection.

6. The method of claim 1, wherein said control streams comprise a first data flow connecting an XLSP protocol in each XML router, a second flow connecting an XSMP protocol in each router, and said data flow comprises a third flow connecting a Data Plane Forwarding Engine in each router.

7. The method of claim 1, comprising a plurality of said control data flows mapped onto a common output queue.

8. The method of claim 1, wherein said output queues are serviced using a weighted round robin scheme, with each queue being allocated a different weight.

9. The method of claim 8, wherein said queues are assigned weights M:N such that the bandwidth guaranteed to the control queue is M/M+N.

10. A content router for use in a content-routed data communications network wherein control data flows constituting control plane traffic and customer data flows constituting dataplane traffic are exchanged between said content routers, said control data flows including application protocol messages forming part of a routing protocol, said router comprising:

a plurality of application subsystems associated with said respective control data and customer data flows;

a socket for establishing a virtual connection with another router in the network, whereby pairs of routers are interconnected by respective virtual connections;

an HTTP function for establishing an HTTP layer within said virtual connection;

said HTTP function formatting said control data and customer data flows as HTTP control and data messages within said HTTP layer and assigning to each of said application subsystems within a said router an HTTP header field; and said HTTP function multiplexing control data and customer data flows over said HTTP layer using HTTP header fields to distinguish between said flows within each said virtual connection;

control and data queues for queuing said formatted respective HTTP control and data messages, said queues being assigned weights; and a connection manager for sending messages from said respective queues into said virtual connection, said connection manager, in the event of congestion in said virtual connection, taking into account said weights to guarantee to said control messages a fraction of total available bandwidth determined by the weights assigned to the respective queues, and wherein said content router is an XML-based router, wherein said XML router further comprises an XML link state protocol, an XML subscription management protocol, and a dataplane forwarding engine, and wherein said control flows comprise a first data flow for connecting said XML link state protocol to another XLM link state protocol in a remote router, and a second flow for connecting said XML subscription management protocol to another SXML subscription management protocol in the remote router, and wherein said customer data flow connects the data plane forwarding engine to another data plane forwarding engine in the remote router.

11. The router of claim 10, further comprising a scheduler for imposing a queueing discipline on outbound traffic over said HTTP layer.

12. The router of claim 10, wherein said scheduler includes a weighted round robin scheduler.

13. The router of claim 10, wherein said control data flows control application sub-systems within a network element, and said router is configured to identify application sub-systems using HTTP URI arguments.

14. The router of claim 10, wherein said router is configured to identify application sub-systems using "absolute path" portions of HTTP URIs.

15. The router of claim 10, wherein said application protocol messages control application sub-systems within a network element, and said router is configured to identify application sub-systems using HTTP header fields other than a URI field.

\* \* \* \* \*